3,219,263
COMPRESSOR FOR A GAS TURBINE ENGINE
David Omri Davies, Derby, Robert Vaughan Blackhurst, Ripley, and John Michael Storer Keen, Derby, England, assignors to Rolls-Royce Limited, Derby, England, a company of Great Britain
Filed Jan. 30, 1963, Ser. No. 254,995
Claims priority, application Great Britain, Jan. 30, 1962, 3,543/62
5 Claims. (Cl. 230—122)

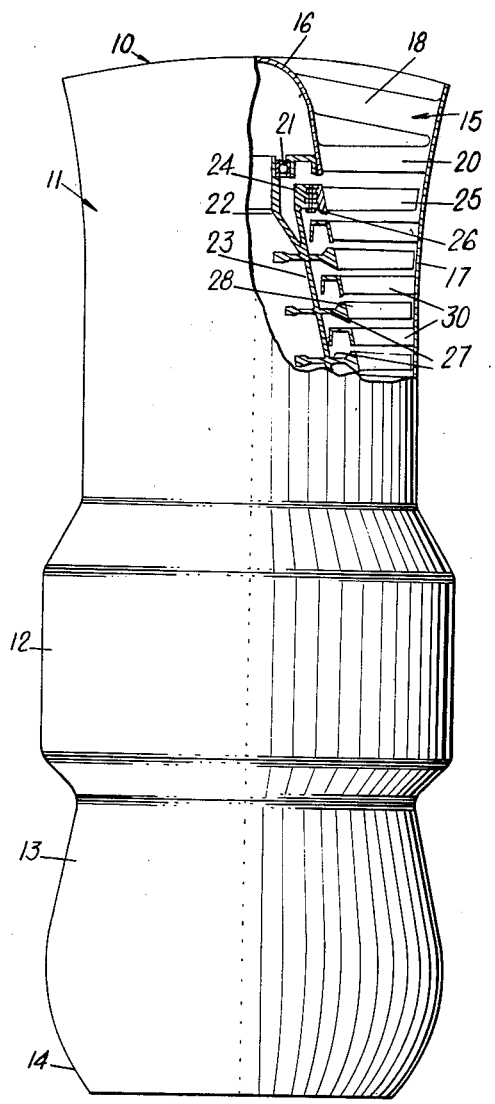

This invention concerns a compressor for a gas turbine engine.

According to the present invention, there is provided a multi-stage, axial flow, compressor for a gas turbine engine, said compressor having a first stage whose rotor blades are formed of a metal or alloy adapted to withstand the bending stresses and erosive action to which it will be subjected in use, the rotor blades of the remaining stages of the compressor being formed of a synthetic resin material.

The said metal or alloy may be steel or a magnesium-based alloy but is preferably an aluminium based alloy.

Preferably, the rotor and rotor discs of the compressor are also made of the said metal or alloy.

The synthetic resin material is preferably reinforced with fibres of glass or asbestos, while the synthetic resin material itself is preferably an epoxy or a phenolic resin.

The compressor may have a casing and/or inlet guide vanes, and/or stator blades made of the said synthetic resin material.

The compressor may also have an air intake portion within which is mounted a nose cone which is supported from the casing by struts, said nose cone and struts being formed of the said synthetic resin material.

The rotor blades of at least one of the stages of the compressor may be pivotally connected to their rotor discs by pins, the weights of the various pins being selected so as to ensure balancing of the rotor. Thus the rotor blades of at least the first stage may be pivotally connected to their rotor disc by the said pins.

The invention also comprises a gas turbine engine (e.g., a gas turbine vertical lift engine) provided with a compressor as set forth above.

The term "vertical lift engine," as used in this specification, is intended to indicate an engine which is adapted to produce vertical lift forces on an aircraft independently of those generated aerodynamically by forward flight of the aircraft.

The invention is illustrated, merely by way of example, in the accompanying drawing which is a diagrammatic elevation, partly in section, of a gas turbine vertical lift engine provided with a compressor in accordance with the present invention.

Referring to the drawing, a gas turbine vertical lift engine 10 comprises in flow series a multi-stage (e.g., a seven-stage) axial flow compressor 11, combustion equipment 12, and a turbine 13, the turbine exhaust gas being directed to atmosphere through a short jet pipe 14.

The compressor 11 has an air intake portion 15 within which is mounted a nose cone 16 which is supported from the compressor casing 17 by a plurality of angularly spaced apart struts 18. A plurality of angularly spaced apart inlet guide vanes 20 extend between the casing 17 and the downstream end of the nose cone 16.

A bearing 21 is supported within the nose cone 16. Within the bearing 21 is rotatably mounted a shaft 22 which is connected to the compressor rotor 23. The latter has a first-stage rotor disc 24 which is pivotally connected to its rotor blades 25 by pins 26. The weights of the pins 26 are selected (e.g., by varying the size or composition of the pins 26) so as to ensure balancing of the rotor 23.

The remaining stages of the compressor 11 have rotor discs 27 which carry rotor blades 28. The blades 28 are shown as being rigidly secured to the rotor discs 27 but could, if desired, be pivotably connected to their rotor discs 27 by pins (not shown) of varying weights.

Stator blades 30 are provided between adjacent stages of the compressor 11.

The first-stage rotor blades 25, the rotor 23, and the rotor discs 24, 27 are formed of an aluminium-based alloy while the rotor blades 28 of the remaining stages, the casing 17, the stator blades 30, the inlet guide vanes 20, the nose cone 16, and the struts 18 are formed of a synthetic resin such as an epoxy or a phenolic resin reinforced with glass or asbestos fibres.

The formation of the first-stage rotor blades 25 from an aluminium-based alloy enables them to withstand the bending stresses and erosive action to which such first-stage rotor blades are subjected in use, such bending stresses, for example, being caused by pressure differentials within the compressor. If, on the other hand, the first-stage rotor blades 25 were made of a synthetic resin such as is used for the rotor blades 28, the blades 25, when subjected to such pressure differentials, would break instead of bend.

The rotor blades 28 of the remaining stages are not, however, subjected to such severe bending stresses or erosive action and thus may be made of a synthetic resin material.

A preferred aluminium-based alloy for the formation of the first stage rotor blades 25, the rotor 23, and the rotor discs 24, 27 has the following percentage composition by weight:

|  | Percent |
| --- | --- |
| Copper | 2.1–2.7 |
| Nickel | 1.0–1.4 |
| Magnesium | 1.4–1.65 |
| Iron | 0.9–1.2 |
| Titanium | 0.02–0.15 |
| Silicon | 0–0.25 | the balance being aluminium and impurities.

Thus provided, in accordance with the present invention, the first-stage rotor blades 25 are made of an aluminium-based alloy (or other metal or alloy which will withstand the bending stresses and erosive action to which the blades 25 are subjected in use), the rotor blades 28 of the remaining stages may be made of a synthetic resin material, whereby to cheapen and lighten the engine.

We claim:
1. A multi-stage, axial flow, compressor for a gas turbine engine comprising: a casing having an air intake portion, a nose cone, struts supporting said nose cone from said casing in the air intake portion thereof, inlet guide vanes, stator blades, a rotor supporting stages of rotor blades, the first stage of rotor blades being formed of an alloy which will withstand the bending stresses and erosive action to which they are subjected in use, and the remaining stages of rotor blades, the stator blades, the inlet guide vanes, the nose cone, struts, and casing being formed of synthetic resin material.
2. A compressor as claimed in claim 1 wherein said alloy for the first stage rotor blades is steel.
3. A compressor as claimed in claim 1 wherein said alloy for the first stage rotor blades is a magnesium-based alloy.
4. A compressor as claimed in claim 1 wherein said alloy for the first stage rotor blades is an aluminium-based alloy.
5. A compressor as claimed in claim 1 wherein the synthetic resin material is fiber reinforced.

(References on following page)

References Cited by the Examiner

UNITED STATES PATENTS

| | | | |
|---|---|---|---|
| 2,430,140 | 11/1947 | Phelan et al. | 253—77.4 |
| 2,667,327 | 1/1954 | Hardigg | 253—77 |
| 2,741,454 | 4/1956 | Eppley | 230—134.3 |
| 2,868,439 | 1/1959 | Hampshire et al. | 230—133 |
| 2,950,083 | 8/1960 | Compton et al. | 353—77 |
| 2,995,294 | 8/1961 | Warnken | 230—132 |
| 3,091,382 | 5/1963 | Shelley | 230—122 |

FOREIGN PATENTS

| | | |
|---|---|---|
| 502,409 | 3/1939 | Great Britain. |
| 755,253 | 8/1956 | Great Britain. |
| 853,331 | 11/1960 | Great Britain. |

KARL J. ALBRECHT, *Primary Examiner.*

JOSEPH H. BRANSON, JR., HENRY F. RADUAZO,
*Examiners.*